United States Patent
Ji

(10) Patent No.: US 10,824,844 B2
(45) Date of Patent: Nov. 3, 2020

(54) FINGERPRINT ACQUISITION METHOD, APPARATUS AND COMPUTER-READABLE STORAGE MEDIUM

(71) Applicant: BEIJING XIAOMI MOBILE SOFTWARE CO., LTD., Beijing (CN)

(72) Inventor: Chuanshun Ji, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/273,509

(22) Filed: Feb. 12, 2019

(65) Prior Publication Data

US 2019/0266382 A1   Aug. 29, 2019

(30) Foreign Application Priority Data

Feb. 27, 2018   (CN) .......................... 2018 1 0161067

(51) Int. Cl.
*G06K 9/00* (2006.01)
*G06F 3/041* (2006.01)
*G06F 1/3234* (2019.01)

(52) U.S. Cl.
CPC ......... *G06K 9/00087* (2013.01); *G06F 1/325* (2013.01); *G06F 1/3259* (2013.01); *G06F 3/041* (2013.01); *G06F 3/0414* (2013.01); *G06K 9/00013* (2013.01); *G06F 2203/0338* (2013.01); *G06F 2203/04105* (2013.01); *G06F 2203/04106* (2013.01)

(58) Field of Classification Search
CPC ............ G06K 9/00087; G06K 9/00013; G06F 3/0414; G06F 1/3259; G06F 1/325; G06F 3/041; G06F 2203/0338; G06F 2203/04106; G06F 2203/04105; G06F 1/3265

See application file for complete search history.

(56) References Cited

U.S. PATENT DOCUMENTS

| 2011/0080349 | A1* | 4/2011 | Holbein | ................ G06F 1/3203 |
| | | | | 345/173 |
| 2015/0277652 | A1* | 10/2015 | Kim | ........................ G06Q 20/40 |
| | | | | 345/173 |
| 2016/0171281 | A1* | 6/2016 | Park | ........................ G06F 3/044 |
| | | | | 382/124 |
| 2017/0160819 | A1 | 6/2017 | Yi | |
| 2017/0316248 | A1* | 11/2017 | He | ...................... G06K 9/00006 |
| 2017/0316250 | A1* | 11/2017 | Roh | ......................... G06F 21/32 |
| 2017/0351850 | A1* | 12/2017 | Jin | ............................ G06F 21/32 |
| 2018/0035923 | A1* | 2/2018 | Kang | ...................... A61B 5/117 |

(Continued)

FOREIGN PATENT DOCUMENTS

EP    3239879 A1   11/2017

OTHER PUBLICATIONS

Extended European Search Report in EP 19159456.3 dated Jul. 4, 2019.

*Primary Examiner* — Premal R Patel
(74) *Attorney, Agent, or Firm* — Syncoda LLC; Feng Ma

(57) ABSTRACT

A method and an apparatus for acquiring a fingerprint, and a computer-readable storage medium include: performing fingerprint acquisition by a fingerprint recognition chip upon a touch operation acting on a display screen of a mobile terminal being detected by a touch sensor to be in a fingerprint recognition area, and a touch pressure corresponding to the touch operation being detected by a pressure sensor to be greater than a preset pressure.

21 Claims, 11 Drawing Sheets

A touch operation acting on the display screen of the mobile terminal is detected by the touch sensor, and a touch pressure corresponding to the touch operation is detected by the pressure sensor — 201

It is judged whether the touch operation is within the fingerprint recognition area, and whether the touch pressure corresponding to the touch operation is greater than a preset pressure — 202

When the touch operation is within the fingerprint recognition area, and the touch pressure corresponding to the touch operation is greater than the preset pressure, the fingerprint acquisition is performed by the fingerprint recognition chip — 203

(56) References Cited

U.S. PATENT DOCUMENTS

| | | | |
|---|---|---|---|
| 2018/0101711 A1* | 4/2018 | D'Souza | G06K 9/0002 |
| 2018/0173927 A1* | 6/2018 | Medina | G06F 1/3231 |
| 2018/0218195 A1* | 8/2018 | Sheik-Nainar | G06K 9/00355 |
| 2018/0329560 A1* | 11/2018 | Kim | G06K 9/00006 |
| 2019/0026527 A1* | 1/2019 | He | G06K 9/0002 |
| 2019/0310723 A1* | 10/2019 | Kang | G06Q 20/40 |
| 2019/0354226 A1* | 11/2019 | Choi | H04L 63/0861 |

* cited by examiner

Performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure — 101

FIG. 1

A touch operation acting on the display screen of the mobile terminal is detected by the touch sensor, and a touch pressure corresponding to the touch operation is detected by the pressure sensor — 201

It is judged whether the touch operation is within the fingerprint recognition area, and whether the touch pressure corresponding to the touch operation is greater than a preset pressure — 202

When the touch operation is within the fingerprint recognition area, and the touch pressure corresponding to the touch operation is greater than the preset pressure, the fingerprint acquisition is performed by the fingerprint recognition chip — 203

FIG. 2

FINGERPRINT ACQUISITION METHOD, APPARATUS AND COMPUTER-READABLE STORAGE MEDIUM

CROSS-REFERENCE TO RELATED APPLICATIONS

The present application claims priority to Chinese patent application No. 201810161067.1 filed on Feb. 27, 2018, the disclosure of which is hereby incorporated reference in its entirety.

BACKGROUND

Fingerprint recognition technology has been widely used in the process of unlocking display screen of a mobile terminal and unlocking an application. At present, as more and more mobile terminals begin to adopt full display screens, on-screen fingerprint recognition technology has become the trend of mobile terminal fingerprint recognition technologies. Prior to performing fingerprint recognition, the mobile terminal may first detect a touch operation of the user's finger by a fingerprint recognition chip, and acquire a fingerprint of the user after detecting the touch operation.

SUMMARY

The present disclosure relates to the field of mobile terminal technology, and more specifically to a fingerprint acquisition method, apparatus, and computer-readable storage medium.

According to a first aspect of various embodiments of the present disclosure, a fingerprint acquisition method is provided, including: performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure; wherein the touch sensor is disposed in the display screen, the pressure sensor and the fingerprint recognition chip are disposed underlying the display screen, and the fingerprint recognition area refers to an area corresponding to the fingerprint recognition chip on the display screen.

In some embodiments, the method further includes: when the mobile terminal enters a screen standby state, setting the touch sensor to a running state; accordingly, the performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure includes: detecting the touch operation by the touch sensor; when it is determined by the touch sensor that the touch operation is within the fingerprint recognition area, waking up the mobile terminal by the touch sensor and turning on the pressure sensor; detecting the touch pressure corresponding to the touch operation by the pressure sensor; when the touch pressure is greater than the preset pressure, performing the fingerprint acquisition by the fingerprint recognition chip.

In some embodiments, before the setting the touch sensor to a running state, the method further includes: when a fingerprint unlock setting instruction is received, displaying a system wake-up option; when an activation operation for the system wake-up option is detected, determining a wake-up mode of the mobile terminal in the screen standby state as a touch sensor wake-up mode.

In some embodiments, the method further includes: when the mobile terminal enters a screen standby state, setting the pressure sensor to a running state; accordingly, the performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure includes: detecting the touch pressure corresponding to the touch operation by the pressure sensor; when the touch pressure is greater than the preset pressure, waking up the mobile terminal by the pressure sensor and turning on the touch sensor; when it is determined by the touch sensor that the touch operation is within the fingerprint recognition area, performing fingerprint acquisition by the fingerprint recognition chip.

In some embodiments, before the setting the pressure sensor to a running state, the method further includes: when a fingerprint unlock setting instruction is received, displaying a system wake-up option; when an activation operation for the system wake-up option is detected, determining a wake-up mode of the mobile terminal in the screen standby state as a pressure sensor wake-up mode.

In some embodiments, the method further includes: when the mobile terminal enters a screen standby state, setting the touch sensor and the pressure sensor to a running state; accordingly, the performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure includes: detecting the touch operation by the touch sensor, and detecting the touch pressure corresponding to the touch operation by the pressure sensor; when it is determined by the touch sensor that the touch operation is within the fingerprint recognition area and the touch pressure is greater than the preset pressure, performing the fingerprint acquisition by the fingerprint recognition chip.

In some embodiments, before the setting the touch sensor and the pressure sensor to a running state, the method further includes: when a fingerprint unlock setting instruction is received, displaying a system wake-up option; when an activation operation for the system wake-up option is detected, determining a wake-up mode of the mobile terminal in the screen standby state as either a touch sensor wake-up mode or a pressure sensor wake-up mode.

In some embodiments, the determining by the touch sensor that the touch operation is within the fingerprint recognition area includes: determining a coordinate of position point where the touch operation is applied by the touch sensor, and judging whether the coordinate of position point is located within the fingerprint recognition area; if the coordinate of position point is located within the fingerprint recognition area, determining that the touch operation is within the fingerprint recognition area.

In some embodiments, the performing the fingerprint acquisition by the fingerprint recognition chip includes: sending a fingerprint acquisition instruction to the fingerprint recognition chip by the touch sensor or the pressure sensor to trigger the fingerprint recognition chip to perform fingerprint acquisition.

In some embodiments, the method further includes: detecting whether the mobile terminal is currently in a fingerprint registration state or a fingerprint recognition state; if the mobile terminal is currently in the fingerprint registration state or the fingerprint recognition state, executing the step of performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

According to a second aspect of various embodiments of the present disclosure, it provides a fingerprint acquisition apparatus, which includes: an acquiring module configured to perform fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure; wherein the touch sensor is disposed in the display screen, the pressure sensor and the fingerprint recognition chip are disposed under the display screen, and the fingerprint recognition area refers to an area corresponding to the fingerprint recognition chip on the display screen.

In some embodiments, the apparatus further includes: a first setting module configured to set the touch sensor to a running state when the mobile terminal enters a screen standby state; accordingly, the acquiring module includes: a first detecting unit configured to detect the touch operation by the touch sensor; a first turning-on unit configured to wake up the mobile terminal by the touch sensor and turn on the pressure sensor when it is determined by the touch sensor that the touch operation is within the fingerprint recognition area; a second detecting unit configured to detect the touch pressure corresponding to the touch operation by the pressure sensor; and a first acquiring unit configured to perform fingerprint acquisition by the fingerprint recognition chip when the touch pressure is greater than the preset pressure.

In some embodiments, the apparatus further includes: a first displaying module configured to display a system wake-up option when a fingerprint unlock setting instruction is received; a first determining module configured to determine a wake-up mode of the mobile terminal in the screen standby state as a touch sensor wake-up mode when an activation operation for the system wake-up option is detected.

In some embodiments, the apparatus further includes: a second setting module configured to set the pressure sensor to a running state when the mobile terminal enters a screen standby state; accordingly, the acquiring module includes: a third detecting unit configured to detect the touch pressure corresponding to the touch operation by the pressure sensor; a second turning-on unit configured to wake up the mobile terminal by the pressure sensor and turning on the touch sensor when the touch pressure is greater than the preset pressure; a second acquiring unit configured to perform fingerprint acquisition by the fingerprint recognition chip when it is determined by the touch sensor that the touch operation is within the fingerprint recognition area.

In some embodiments, the apparatus further includes: a second displaying module configured to display a system wake-up option when a fingerprint unlock setting instruction is received; a second determining module configured to determine a wake-up mode of the mobile terminal in the screen standby state as a pressure sensor wake-up mode when an activation operation for the system wake-up option is detected.

In some embodiments, the apparatus further includes: a third setting module configured to set the touch sensor and the pressure sensor to a running state when the mobile terminal enters a screen standby state; accordingly, the acquiring module includes: a fourth detecting unit configured to detect the touch operation by the touch sensor, and detect the touch pressure corresponding to the touch operation by the pressure sensor; a third acquiring unit configured to perform fingerprint acquisition by the fingerprint recognition chip when it is determined by the touch sensor that the touch operation is within the fingerprint recognition area and the touch pressure is greater than the preset pressure.

In some embodiments, the apparatus further includes: a third displaying module configured to display a system wake-up option when a fingerprint unlock setting instruction is received; a third determining module configured to determine a wake-up mode of the mobile terminal in the screen standby state as either a touch sensor wake-up mode or a pressure sensor wake-up mode when an activation operation for the system wake-up option is detected.

In some embodiments, wherein the acquiring module further includes: a judging unit configured to determine a coordinate of position point where the touch operation is applied by the touch sensor, and determine whether the coordinate of position point is located within the fingerprint recognition area; and a determining unit configured to determine that the touch operation is within the fingerprint recognition area if the coordinate of position point is located within the fingerprint recognition area.

In some embodiments, the acquiring module is specifically configured to: send a fingerprint acquisition instruction to the fingerprint recognition chip by the touch sensor or the pressure sensor to trigger the fingerprint recognition chip to perform fingerprint acquisition.

In some embodiments, the apparatus further includes: a detecting module configured to detect whether the mobile terminal is currently in a fingerprint registration state or a fingerprint recognition state; a triggering module configured to, if the mobile terminal is currently in the fingerprint registration state or the fingerprint recognition state, trigger the acquiring module to perform fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

According to a third aspect of various embodiments of the present disclosure, it provides a fingerprint acquisition apparatus, which includes: a processor; a storage device configured to store an executable instruction of the processor; wherein the processor is configured to perform the step of the method according to any of the first aspect.

According to a fourth aspect of various embodiments of the present disclosure, it provides a computer-readable storage medium stored with an instruction, wherein the instruction is executed by a processor to perform the step of the method according to any of the first aspect.

Various embodiments of the present disclosure can have one or more of the following advantages: the mobile terminal may detect a touch operation by a touch sensor disposed in the display screen, and detect a touch pressure corresponding to the touch operation through a pressure sensor disposed under the display screen, if the touch operation is within the fingerprint recognition area and if the touch pressure is greater than the preset pressure, the fingerprint recognition chip can be used for fingerprint acquisition. It can be seen that, in various embodiments of the present disclosure, for the mobile terminal with the fingerprint recognition chip hidden under the display screen, the touch sensor disposed in the display screen can be directly used to detect the touch operation, and the pressure sensor disposed under the display screen can be used to detect the touch pressure corresponding to the touch operation, thereby determining whether the trigger operation needs to trigger the fingerprint recognition chip to perform image acquisition. In this way, during the use of the mobile terminal, it is possible to avoid additional power consumption of the fingerprint recognition chip during fingerprint acquisition due to an erroneous operation triggered by the user, and a standby time of the mobile terminal is prolonged.

It should be understood that the above general description and the detailed description in the following text are only intended to be illustrative and explanatory, and are not intended to limit the present disclosure.

BRIEF DESCRIPTION OF THE DRAWINGS

To clearly illustrate the various embodiments provided in the present disclosure, the following drawings are provided accompanying the description of the embodiments.

It is noted that these drawings should be interpreted to serve illustrating purposes only, and that these drawings may represent just some, but not all, of embodiments of the present disclosure. For those or ordinary skill in the art, other embodiments that are based on the structures as described below and illustrated in these drawings may become apparent. As such, these other embodiments should be interpreted to be contained within the scope of the disclosure.

FIG. 1 is a flowchart of a fingerprint acquisition method according to some embodiments;

FIG. 2 is a flowchart of a fingerprint acquisition method according to some embodiments;

DETAILED DESCRIPTION

Figure 3:
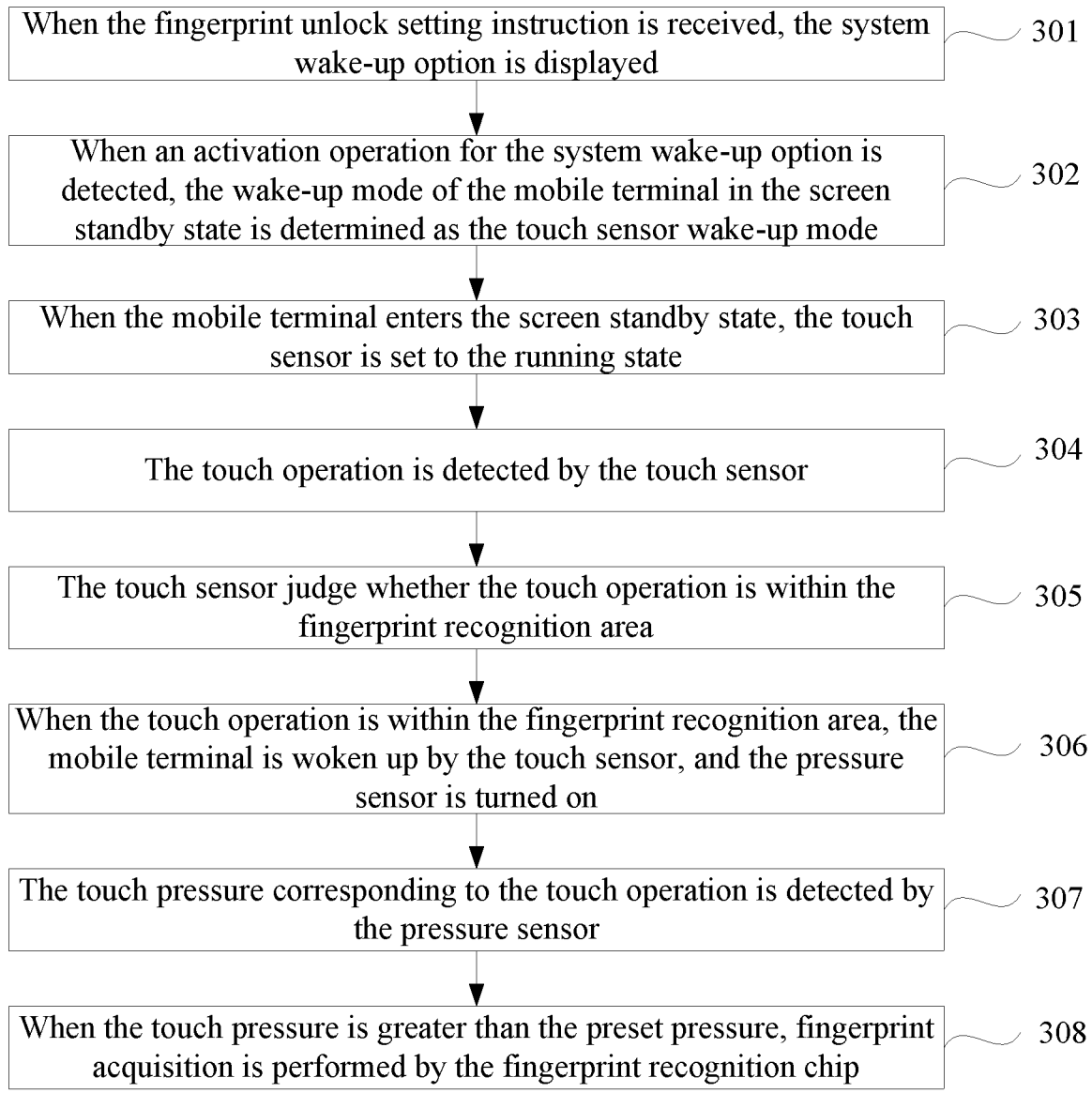
FIG. 3 is a flowchart of a fingerprint acquisition method according to some embodiments.

Descriptions will now be made in detail with respect to some embodiments, examples of which are illustrated in the accompanying drawings. The following description refers to the accompanying drawings in which the same numbers in different drawings may represent the same or similar elements unless otherwise represented. The implementations set forth in the following description of example embodiments do not represent all implementations consistent with the disclosure. Instead, they are merely examples of devices and methods consistent with aspects related to the disclosure as recited in the appended claims.

Fingerprint recognition technologies widely adopted in mobile terminals generally have three different types, including button-type fingerprint recognition, glass inner layer fingerprint recognition, and on-screen fingerprint recognition.

The button-type fingerprint recognition mainly refers to setting the fingerprint recognition chip on the rear panel of the mobile terminal or the home button of the mobile terminal. The glass inner layer fingerprint recognition is to set the fingerprint recognition chip under the glass panel of the mobile terminal. On-screen fingerprint recognition is to set the fingerprint recognition chip under the display screen of the mobile terminal.

In these technologies, the mobile terminal generally first detects the touch operation of the user's finger, and performs fingerprint acquisition after detecting the touch operation.

For the on-screen fingerprint recognition technologies, because the fingerprint recognition chip is usually disposed under the display layer of the mobile terminal, the user's finger usually cannot directly contact the fingerprint recognition chip.

The inventor of the present disclosure has recognized that, in the process of using the mobile terminal by the user, because the display screen of the mobile terminal can adopt a capacitor technology, it may be prone to an erroneous operation within the fingerprint recognition area corresponding to the fingerprint recognition chip, thereby causing the fingerprint recognition chip to perform invalid fingerprint acquisition and fingerprint recognition. Therefore, there is a need for a method for detecting a touch operation of a user's finger.

The fingerprint acquisition method provided by various embodiments of the present disclosure may be employed to perform detection of a touch operation and a touch pressure corresponding to the touch operation in the process of performing fingerprint recognition by using the on-screen fingerprint recognition technology, and then perform fingerprint acquisition after detecting the touch operation and the touch pressure corresponding to the touch operation.

FIG. 1 is a flowchart of a fingerprint acquisition method according to some embodiments. As shown, the method may be employed in a mobile terminal such as a smart phone or a tablet computer, and can include the following steps.

In step 101, fingerprint acquisition is performed by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

Wherein the touch sensor is disposed in the display screen, the pressure sensor and the fingerprint recognition chip are disposed under the display screen, and the fingerprint recognition area refers to an area corresponding to the fingerprint recognition chip on the display screen.

In some embodiments of the present disclosure, the mobile terminal may detect a touch operation by a touch sensor disposed in the display screen, and detect a touch pressure corresponding to the touch operation through a pressure sensor disposed under the display screen.

If the touch operation is within the fingerprint recognition area, and if the touch pressure is greater than the preset pressure, the fingerprint recognition chip can be used for fingerprint acquisition.

It can be seen that, in some embodiments of the present disclosure, for the mobile terminal with the fingerprint recognition chip hidden under the display screen, the touch sensor disposed in the display screen can be directly used to detect the touch operation, and the pressure sensor disposed under the display screen can be used to detect the touch pressure corresponding to the touch operation, thereby determining whether the trigger operation needs to trigger the fingerprint recognition chip to perform image acquisition.

In this way, during the use of the mobile terminal, it is possible to avoid additional power consumption of the fingerprint recognition chip during fingerprint acquisition due to an erroneous operation triggered by the user, and a standby time of the mobile terminal is prolonged by reducing the standby-mode power consumption.

In some embodiments, the method can further comprise the following operations.

When the mobile terminal enters a screen standby state, the touch sensor is set to a running state.

Accordingly, the performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure comprises the followings:

The touch operation is detected by the touch sensor.

When it is determined by the touch sensor that the touch operation is within the fingerprint recognition area, the mobile terminal is woken up by the touch sensor and the pressure sensor is turned on.

The touch pressure corresponding to the touch operation is detected by the pressure sensor.

When the touch pressure is greater than the preset pressure, the fingerprint acquisition is performed by the fingerprint recognition chip.

In some embodiments, prior to the setting the touch sensor to a running state, the method further comprises the following operations.

When a fingerprint unlock setting instruction is received, a system wake-up option is displayed.

When an activation operation for the system wake-up option is detected, a wake-up mode of the mobile terminal in the screen standby state is determined as a touch sensor wake-up mode.

In some embodiments, the method further comprises the following operations.

When the mobile terminal enters a screen standby state, the pressure sensor is set to a running state.

Accordingly, the performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure comprises the followings operations.

The touch pressure corresponding to the touch operation is detected by the pressure sensor.

When the touch pressure is greater than the preset pressure, the mobile terminal by the pressure sensor is woken up and the touch sensor is turned on.

The touch operation is detected by the touch sensor.

When the touch operation is within the fingerprint recognition area, the fingerprint acquisition is performed by the fingerprint recognition chip.

In some embodiments, prior to the setting the pressure sensor to a running state, the method further comprises the following operations.

When a fingerprint unlock setting instruction is received, a system wake-up option is displayed.

When an activation operation for the system wake-up option is detected, a wake-up mode of the mobile terminal in the screen standby state is determined as a pressure sensor wake-up mode.

In some embodiments, the method further comprises the following operations.

When the mobile terminal enters a screen standby state, the touch sensor and the pressure sensor are set to a running state.

Accordingly, the performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure comprises the following operations.

The touch operation is detected by the touch sensor, and the touch pressure corresponding to the touch operation is detected by the pressure sensor.

When it is determined by the touch sensor that the touch operation is within the fingerprint recognition area and the touch pressure is greater than the preset pressure, the fingerprint acquisition is performed by the fingerprint recognition chip.

In some embodiments, prior to the setting the touch sensor and the pressure sensor to a running state, the method further comprises the following operations.

When a fingerprint unlock setting instruction is received, a system wake-up option is displayed.

When an activation operation for the system wake-up option is detected, a wake-up mode of the mobile terminal in the screen standby state is determined as either a touch sensor wake-up mode or a pressure sensor wake-up mode.

In some embodiments, the determining by the touch sensor that the touch operation is within the fingerprint recognition area comprises the following operations.

A coordinate of position point where the touch operation is applied by the touch sensor is determined, and whether the coordinate of position point is located within the fingerprint recognition area is determined.

If the coordinate of position point is located within the fingerprint recognition area, it is determined that the touch operation is within the fingerprint recognition area.

In some embodiments, the performing the fingerprint acquisition by the fingerprint recognition chip comprises the followings:

A fingerprint acquisition instruction is sent to the fingerprint recognition chip by the touch sensor or the pressure sensor to trigger the fingerprint recognition chip to perform fingerprint acquisition.

In some embodiments, the method further comprises the following operations.

Whether the mobile terminal is currently in a fingerprint registration state or a fingerprint recognition state is detected.

If the mobile terminal is currently in the fingerprint registration state or the fingerprint recognition state, fingerprint acquisition is performed by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

The various operations or steps can have different orders and combinations according to various embodiments of the present disclosure.

FIG. 2 is a flowchart of a fingerprint acquisition method according to some embodiments. As shown in FIG. 2, the method can be used in a mobile terminal such as a smartphone or a tablet, and the method comprises the following steps.

In step 201, a touch operation acting on the display screen of the mobile terminal is detected by the touch sensor, and a touch pressure corresponding to the touch operation is detected by the pressure sensor.

At present, the mobile terminals are usually configured with a touch display screen, and a touch sensor is disposed in the display screen. When the user touches the display screen, the touch sensor can detect a touch signal triggered by the user's touch operation, thereby determining that the touch operation is currently detected. When detecting the touch pressure corresponding to the touch operation, a pressure sensor under the display screen may be employed.

When the user touches the display screen, an area of the display screen corresponding to the pressure sensor may be deformed by the user's touch operation and generate an electrical signal of a corresponding value. When the electrical signal is detected by the pressure sensor, the touch pressure corresponding to the touch operation may be determined based on the electrical signal.

Wherein, the pressure sensor can be placed at any position under the display screen, as long as the pressure sensor can detect the deformation of the display.

In some embodiments, the mobile terminal may detect whether the mobile terminal is currently in the fingerprint registration state or the fingerprint recognition state before detecting the touch operation by the touch sensor and before detecting the touch pressure corresponding to the touch operation by the pressure sensor. If it is currently in the fingerprint registration state or the fingerprint recognition state, the mobile terminal may detect the touch operation by the touch sensor, and detect the touch pressure corresponding to the touch operation by the pressure sensor.

Wherein, the user may trigger the fingerprint registration instruction by selecting a fingerprint registration option in the mobile terminal. The mobile terminal may detect whether the fingerprint registration instruction is received in real time, and if the fingerprint registration instruction is received, the fingerprint registration page may be displayed, and it is determined that the mobile terminal is currently in the fingerprint registration state.

In addition, the mobile terminal may detect whether the display screen is currently in the screen lock state in real time. If the mobile terminal is currently in the screen lock state, it can be determined that the mobile terminal is currently in the fingerprint recognition state. If the mobile terminal is not currently in the screen lock state, the mobile terminal may detect whether a selection operation for the target application is received, wherein the target application refers to an application installed in the mobile terminal that needs to be unlocked by using fingerprint recognition. If the mobile terminal detects the user's selection operation for the target application, it is determined that it is currently in the fingerprint recognition state.

In some other embodiments, the mobile terminal may detect whether the terminal is currently in the fingerprint registration state or the fingerprint recognition state after detecting the touch operation by the touch sensor and detecting the touch pressure corresponding to the touch operation by the pressure sensor. When it is detected that the terminal is currently in the fingerprint registration state or the fingerprint recognition state, it is determined in step 202 whether the touch operation is within the fingerprint recognition area, and whether the touch pressure corresponding to the touch operation is greater than a preset pressure. In this way, for a touch operation and a touch pressure corresponding to the touch operation detected in a non-fingerprint registration state or a non-fingerprint recognition state, since such a touch operation is not for unlocking, the mobile terminal can exclude the touch operation and the touch pressure corresponding to the touch operation and no longer continue to perform the subsequent steps, reducing the number of times of processing by the mobile terminal. Wherein, for the manner in which the mobile terminal detects the fingerprint registration state or the fingerprint recognition state, reference may be made to the foregoing description, and details are not described herein again.

In step 202, it is determined whether the touch operation is within the fingerprint recognition area, and whether the touch pressure corresponding to the touch operation is greater than a preset pressure.

In various embodiments of the present disclosure, when the mobile terminal detects a touch operation by the touch sensor and detects a touch pressure corresponding to the touch operation by the pressure sensor; or when the mobile terminal detects a touch operation by the touch sensor, detects a touch pressure corresponding to the touch operation by the pressure sensor, and determines that it is currently in the fingerprint registration state or the fingerprint recognition state, the mobile terminal may further determine whether the touch operation is within the fingerprint recognition area, and whether the touch pressure corresponding to the touch operation is greater than a preset pressure, and further determine whether to perform fingerprint acquisition according to the determination result.

Wherein the mobile terminal may determine whether the touch operation is within the fingerprint recognition area by the following two different manners.

In a first manner, a coordinate of position point of the touch operation is determined by the touch sensor, and it is determined whether the coordinate of position point is located within the fingerprint recognition area; if the coordinate of position point is within the fingerprint recognition area, it is determined that the touch operation is within the fingerprint recognition area.

In this implementation, after the touch sensor detects the touch signal triggered by the touch operation of the user, the coordinate of position point of the touch operation may be calculated according to the touch signal. Thereafter, the touch sensor can determine whether the coordinate of position point is located within the fingerprint recognition area, that is, the area on the display screen corresponding to the fingerprint recognition chip disposed under the display screen. If the coordinate of position point is within the fingerprint recognition area, the touch sensor may determine that the touch operation is within the fingerprint recognition area; otherwise, the touch sensor may determine that the touch operation is not within the fingerprint recognition area.

In a second manner, the coordinate of position point to which the touch operation is applied is determined by the touch sensor, and the coordinate of position point is sent to the fingerprint recognition chip by the touch sensor; it is determined by the fingerprint recognition chip whether the coordinate of position point is within the fingerprint recognition area; if the coordinate of position point is within the fingerprint recognition area, it is determined that the touch operation is within the fingerprint recognition area.

In this implementation, after detecting the touch operation, the touch sensor may calculate the coordinate of position point of the touch operation by the touch signal triggered by the touch operation. Thereafter, the touch sensor may send the coordinate of position point to the fingerprint recognition chip. After receiving the coordinate of position point, the fingerprint recognition chip may compare the coordinate of position point with the fingerprint recognition area. If the coordinate of position point is located within the fingerprint recognition area, it is determined that the touch operation is within the fingerprint recognition area. Otherwise, it is determined that the touch operation is not within the fingerprint recognition area.

Wherein, when the mobile terminal determines whether the touch pressure corresponding to the touch operation detected by the pressure sensor is greater than a preset pressure, the preset pressure may be stored to the pressure sensor in advance, or may be stored to the fingerprint recognition chip in advance. If the preset pressure is stored in the pressure sensor, the touch pressure detected by the pressure sensor may be directly compared with the preset pressure to determine whether the touch pressure is greater than the preset pressure; if the preset pressure is stored in the fingerprint recognition chip, the pressure sensor sends the detected touch pressure to the fingerprint recognition chip, and the fingerprint recognition chip determines whether the touch pressure is greater than the preset pressure. Wherein, the preset pressure may be set in advance based on the usage habits of the user, and during the use of the user, the user may increase or decrease the preset pressure based on the actual experience to facilitate the user's use.

It should be noted that, in the foregoing step 201 through step 202, when the touch operation is detected by the touch sensor and it is determined whether the touch operation is within the fingerprint recognition area, and the touch pressure corresponding to the touch operation is detected by the pressure sensor and it is determined whether the touch pressure is greater than the preset pressure, the detection of the touch operation and the determination of whether the touch operation is within the fingerprint recognition area can also be implemented in other manners, and the detection of the touch pressure corresponding to the touch operation and the determination of whether the touch pressure is greater than the preset pressure may also be implemented in other manners.

For example, the touch operation may be detected by the touch sensor, and when the touch operation is within the fingerprint recognition area, the touch pressure corresponding to the touch operation is detected by the pressure sensor, and it is determined whether the touch pressure is greater than a preset pressure. Alternatively, the touch pressure corresponding to the touch operation may be detected by the pressure sensor, and when the touch pressure is greater than the preset pressure, the touch operation is detected by the touch sensor, and it is determined whether the touch operation is within the fingerprint recognition area. Wherein, for the determination of whether the touch operation is within the fingerprint recognition area, and whether the touch pressure corresponding to the touch operation is greater than the preset pressure, reference may be made to the foregoing description, and details are not described herein again.

In step 203, when the touch operation is within the fingerprint recognition area, and the touch pressure corresponding to the touch operation is greater than the preset pressure, the fingerprint acquisition is performed by the fingerprint recognition chip.

When the mobile terminal determines that the touch operation is within the fingerprint recognition area by the touch sensor or the fingerprint recognition chip, and determines that the touch pressure of the touch operation is greater than the preset pressure by the pressure sensor or the fingerprint recognition chip, the fingerprint recognition chip may be triggered to perform image acquisition.

Wherein, if the mobile terminal determines whether the touch operation is within the fingerprint recognition area by the touch sensor and determines whether the touch pressure corresponding to the touch operation is greater than the preset pressure by the pressure sensor, after it is determined that the touch operation is within the fingerprint recognition area and the touch pressure is greater than the preset pressure, either of the touch sensor and the pressure sensor sends a fingerprint acquisition instruction to the fingerprint recognition chip. When the fingerprint recognition chip receives the fingerprint acquisition instruction, the fingerprint acquisition may be performed.

If the mobile terminal determines whether the touch operation is within the fingerprint recognition area by the fingerprint recognition chip and determines whether the touch pressure corresponding to the touch operation is greater than the preset pressure by the fingerprint recognition chip, after it is determined that the touch operation is within the fingerprint recognition area and the touch pressure is greater than the preset pressure, the fingerprint recognition chip may perform fingerprint acquisition.

In various embodiments of the present disclosure, the mobile terminal may detect the touch operation by the touch sensor disposed in the display screen, and detect the touch pressure corresponding to the touch operation by the pressure sensor disposed under the display screen. If the touch operation is within the fingerprint recognition area and the touch pressure is greater than the preset pressure, the fingerprint recognition chip may perform fingerprint acquisition.

Therefore, in some embodiments of the present disclosure, for the mobile terminal with the fingerprint recognition chip hidden under the display screen, the touch sensor disposed in the display screen may be directly used to detect the touch operation, and the pressure sensor disposed under the display screen may be used to detect the touch pressure corresponding to the touch operation, thereby determining whether the triggering operation needs to trigger the fingerprint recognition chip to perform image acquisition. In this way, during the use of the mobile terminal, the additional power consumption of the fingerprint recognition chip during the fingerprint acquisition process due to the erroneous operation triggered by the user can be avoided, and the standby time of the mobile terminal is prolonged.

The foregoing embodiments involve a specific implementation manner in which the touch operation is detected by the touch sensor, and the touch pressure corresponding to the touch operation is detected by the pressure sensor, and when it is determined that the touch operation is within the fingerprint recognition area and the touch pressure is greater than the preset pressure, the fingerprint is acquired by the fingerprint recognition chip.

In addition, in various embodiments of the present disclosure, when the mobile terminal is in the screen standby state, there may be three cases: the touch sensor disposed in the display screen of the mobile terminal is in a running state and the pressure sensor disposed under the display screen is in a non-running state; or the touch sensor disposed in the display screen of the mobile terminal is in a non-running state and the pressure sensor disposed under the display screen is in a running state; or both the touch sensor and the pressure sensor are in a running state.

Next, the fingerprint acquisition method in these three cases will be described in detail with respect to the following embodiments.

FIG. 3 is a flowchart of a fingerprint acquisition method according to some embodiments. The method may be applied to a mobile terminal such as a smart phone or a tablet computer. The first case described above is set forth in various embodiments of the present disclosure. As shown in FIG. 3, the method comprises the following steps:

In step 301, when the fingerprint unlock setting instruction is received, the system wake-up option is displayed.

In various embodiments of the present disclosure, the user may set the system wake-up mode of the mobile terminal in the screen standby state in advance. Wherein, the user may select a fingerprint unlocking setting option in the mobile terminal to trigger a fingerprint unlocking setting instruction. When the mobile terminal receives the fingerprint unlocking setting instruction, the setting page may be displayed, and a system wake-up option may be displayed in the setting page. The user may activate it by selecting the system wake-up option. The mobile terminal may detect whether the user's activation operation for the system wake-up option is received, and when the activation operation is detected, step 302 is performed.

In step 302, when an activation operation for the system wake-up option is detected, the wake-up mode of the mobile terminal in the screen standby state is determined as the touch sensor wake-up mode.

Wherein, the touch sensor is disposed in the display screen, and the touch sensor wake-up mode refers to a manner in which the mobile terminal detects the touch operation by the touch sensor in the screen standby state, and then wakes up the mobile terminal according to the touch operation.

In step 303, when the mobile terminal enters the screen standby state, the touch sensor is set to the running state.

After setting the system wake-up mode of the mobile terminal through steps 301 and 302, when the mobile terminal enters the screen standby state, the touch sensor may be set to the running state, and the pressure sensor disposed under the display screen is set to the power-down state. The running state may refer to the touch sensor being continuously in running during the screen standby state of the mobile terminal, and the power-down state refers to the pressure sensor being in a power-down state during the screen standby state of the mobile terminal. For example, during the process that the mobile terminal is in the screen standby state, the touch sensor may continue to run, and the pressure sensor stops running, thereby detecting the user's touch operation in real time by the continuously running touch sensor.

In step 304, the touch operation is detected by the touch sensor.

Generally, when the mobile terminal enters the screen standby state, the mobile terminal is in the screen lock state, and as described in the related description in step 303, at this time, the touch sensor in the mobile terminal is continuously running. In this case, the mobile terminal can detect the touch operation in real time by the touch sensor.

In step 305, it is determined by the touch sensor whether the touch operation is within the fingerprint recognition area.

When the mobile terminal detects a touch operation, to avoid the touch operation being an erroneous touch, the mobile terminal may determine whether the touch operation is within the fingerprint recognition area by using the touch sensor, and further determine whether to wake up the system and whether to turn on the pressure sensor after waking up the system according to the determination result.

Wherein, for the implementation process of the mobile terminal to determine whether the touch operation is within the fingerprint recognition area by the touch sensor, reference may be made to the related explanation in step 202 in the foregoing embodiment, and details are not described herein again.

In step 306, when the touch operation is within the fingerprint recognition area, the mobile terminal is woken up by the touch sensor, and the pressure sensor is turned on.

When the touch sensor determines that the touch operation is within the fingerprint recognition area, it indicates that the user currently needs to wake up the system for fingerprint unlocking. At this time, the touch sensor may send a wake-up instruction to the processor of the mobile terminal, thereby waking up the mobile terminal. In order to avoid the touch operation being an invalid touch operation, the pressure sensor may be turned on while waking up the mobile terminal, that is, the pressure sensor is adjusted from the power-down state to the running state to further verify the touch operation by the pressure sensor.

In step 307, the touch pressure corresponding to the touch operation is detected by the pressure sensor.

To further determine whether the touch operation is an erroneous operation, an electric signal corresponding to the deformation of the display screen under the action of the touch operation may be detected by the pressure sensor disposed under the display screen, thereby detecting the touch pressure corresponding to the touch operation.

Further, after detecting the touch pressure corresponding to the touch operation by the pressure sensor, the mobile terminal may determine, by the pressure sensor, whether the touch pressure corresponding to the touch operation is greater than a preset pressure. For the implementation process of judging whether the touch pressure is greater than the preset pressure, reference may be made to the related explanation in step 202 in the foregoing embodiment, and details are not described herein again.

In step 308, when the touch pressure is greater than the preset pressure, fingerprint acquisition is performed by the fingerprint recognition chip.

When the touch pressure corresponding to the touch operation detected by the pressure sensor is greater than the preset pressure, it indicates that the user currently needs to perform fingerprint unlocking on the mobile terminal. At this time, the touch sensor or the pressure sensor may send a fingerprint acquisition instruction to the fingerprint recognition chip disposed under the display screen. When the fingerprint recognition chip receives the fingerprint acquisition instruction, the fingerprint acquisition may be performed, thereby unlocking the mobile terminal according to the acquired fingerprint.

In some embodiments of the present disclosure, the user may set the system wake-up mode of the mobile terminal in the screen standby state to the touch sensor wake-up mode in advance, such that after the mobile terminal enters the screen standby state, the touch sensor can be continuously running, and the touch operation is detected in real time by the touch sensor.

After detecting the touch operation, the touch sensor may determine whether the touch operation is within the fingerprint recognition area. If it is within the fingerprint recognition area, the touch sensor turns on the pressure sensor while waking up the mobile terminal, and the touch pressure corresponding to the touch operation is detected by the pressure sensor.

When the touch pressure is greater than the preset pressure, the fingerprint sensor or the pressure sensor sends a fingerprint acquisition instruction to the fingerprint recognition chip, so that after it is double determined by both the touch sensor and the pressure sensor that the user currently needs to unlock the mobile terminal with fingerprint, the fingerprint recognition chip may perform fingerprint acquisition according to the fingerprint acquisition instruction to unlock the mobile terminal.

It can be seen that various embodiments of the present disclosure can combine the system wake-up process and the display screen unlocking process in the screen standby state of the mobile terminal, which can effectively prevent the user from unlocking the mobile terminal caused by an accidental touch when the mobile terminal is in the screen standby state, or can perform fingerprint acquisition while quickly waking up the system when the user wants to unlock the mobile terminal in the screen standby state, thereby saving power consumption when the mobile terminal is in the screen standby state, and prolonging the standby time of the mobile terminal.

Figure 4:
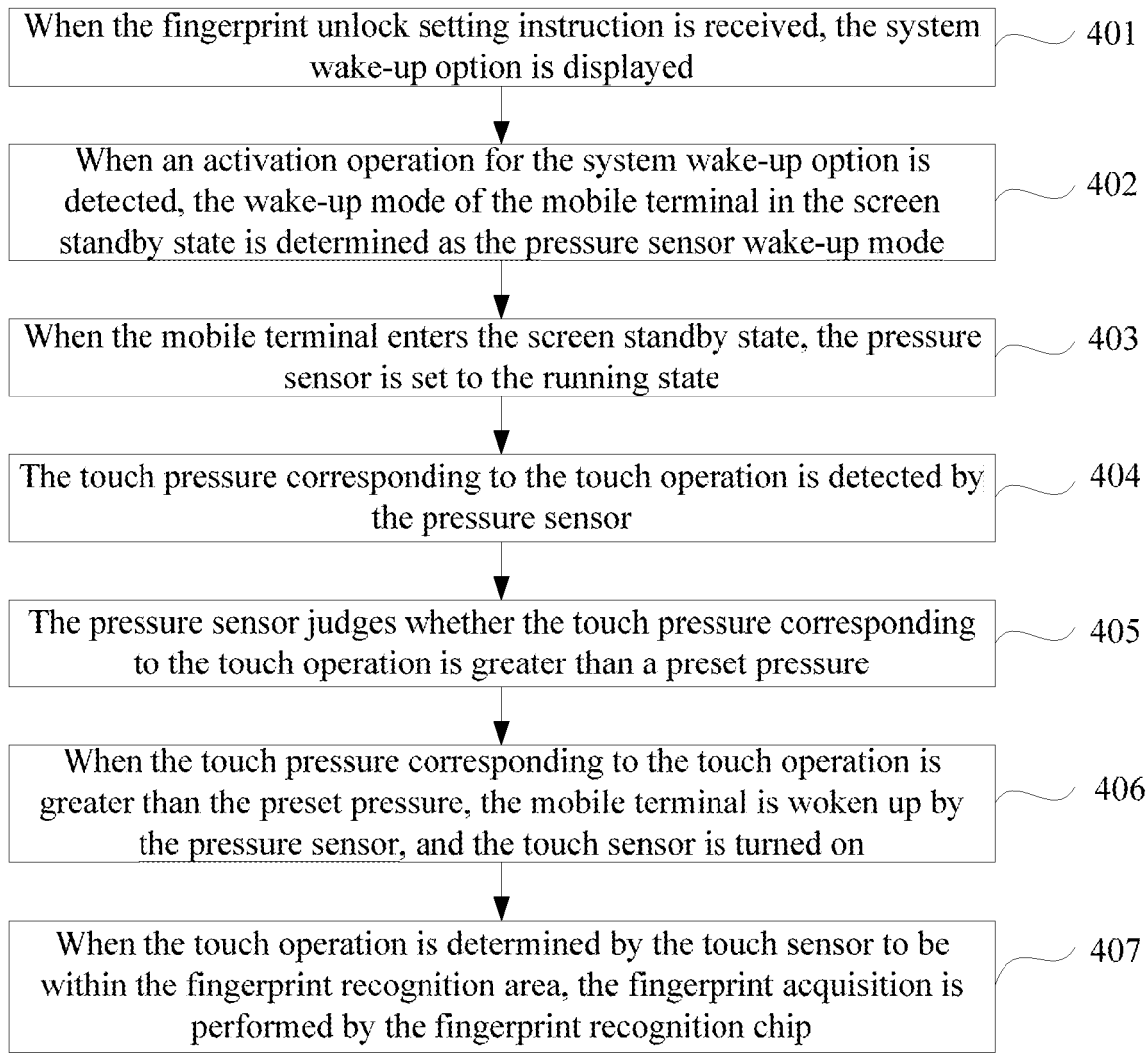
FIG. 4 is a flowchart of a fingerprint acquisition method according to some embodiments.

FIG. 4 is a flowchart of a fingerprint acquisition method according to some embodiments. The method may be applied to a mobile terminal such as a smart phone or a tablet computer. The second case described above is set forth in various embodiments of the present disclosure. As shown in FIG. 4, the method can include the following operations.

In step 401, when the fingerprint unlock setting instruction is received, the system wake-up option is displayed.

In various embodiments of the present disclosure, the user can set the system wake-up mode of the mobile terminal in the screen standby state in advance. Wherein, the user may select a fingerprint unlocking setting option in the mobile terminal to trigger a fingerprint unlocking setting instruction. When the mobile terminal receives the fingerprint unlocking setting instruction, the setting page may be displayed, and a system wake-up option may be displayed in the setting page. The user may activate it by selecting the system wake-up option. The mobile terminal may detect whether the user's activation operation for the system wake-up option is received, and when the activation operation is detected, step 402 is performed.

In step 402, when an activation operation for the system wake-up option is detected, the wake-up mode of the mobile terminal in the screen standby state is determined as the pressure sensor wake-up mode.

Wherein, the pressure sensor is disposed under the display screen, and the pressure sensor wake-up mode refers to a manner in which the mobile terminal detects the touch pressure corresponding to the touch operation by the pressure sensor in the screen standby state, and then wakes up the mobile terminal according to the touch pressure corresponding to the touch operation.

In step 403, when the mobile terminal enters the screen standby state, the pressure sensor is set to the running state.

After setting the system wake-up mode of the mobile terminal through steps 401 and 402, when the mobile terminal enters the screen standby state, the pressure sensor may be set to the running state, and the touch sensor disposed in the display screen is set to the power-down state. The running state may refer to the pressure sensor being continuously in running during the screen standby state of the mobile terminal, and the power-down state refers to the pressure sensor being in a power-down state during the screen standby state of the mobile terminal. That is to say, during the process that the mobile terminal is in the screen standby state, the pressure sensor may continue to run, and the touch sensor stops running, thereby detecting the touch pressure corresponding to the user's touch operation in real time.

In step 404, the touch pressure corresponding to the touch operation is detected by the pressure sensor.

Generally, when the mobile terminal enters the screen standby state, the mobile terminal can be in the screen lock state, and as described in the related description in step 403, at this time, the pressure sensor in the mobile terminal can be continuously running. In this case, the mobile terminal can detect the pressure acting on the display screen in real time by the pressure sensor, and if detected, the detected pressure is determined as the touch pressure corresponding to the touch operation.

In step 405, it is determined by the pressure sensor whether the touch pressure corresponding to the touch operation is greater than a preset pressure.

To avoid the touch operation being an erroneous touch, the mobile terminal may determine whether the touch pressure corresponding to the touch operation is greater than a preset pressure, and further determine whether to wake up the system and whether to turn on the touch sensor after waking up the system according to the determination result.

Wherein, for the implementation process of the mobile terminal to determine whether the touch pressure corresponding to the touch operation is greater than the preset pressure by the pressure sensor, reference may be made to the related explanation in step 202 in the foregoing embodiment, and details are not described herein again.

In step 406, when the touch pressure corresponding to the touch operation is greater than the preset pressure, the mobile terminal is woken up by the pressure sensor, and the touch sensor is turned on.

When the pressure sensor determines that the touch pressure corresponding to the touch operation is greater than the preset pressure, it indicates that the user currently needs to wake up the system for fingerprint unlocking. At this time, the pressure sensor may send a wake-up instruction to the processor of the mobile terminal, thereby waking up the mobile terminal. In order to avoid the touch operation being an invalid touch operation, the touch sensor may be turned on while waking up the mobile terminal, that is, the touch sensor is adjusted from the power-down state to the running state to further verify the touch operation by the touch sensor.

Further, after the touch sensor is turned on, the mobile terminal may determine, by the touch sensor, whether the touch operation is within the fingerprint recognition area. For the implementation process of judging whether the touch operation is within the fingerprint recognition area, reference may be made to the related explanation in step 202 in the foregoing embodiment, and details are not described herein again.

In step 407, when the touch operation is determined by the touch sensor to be within the fingerprint recognition area, the fingerprint acquisition is performed by the fingerprint recognition chip.

When the touch operation is within the fingerprint recognition area, it indicates that the user currently needs to perform fingerprint unlocking on the mobile terminal. At this time, the touch sensor or the pressure sensor may send a fingerprint acquisition instruction to the fingerprint recognition chip disposed under the display screen. When the fingerprint recognition chip receives the fingerprint acquisition instruction, the fingerprint acquisition may be performed, thereby unlocking the mobile terminal according to the acquired fingerprint.

In various embodiments of the present disclosure, the user may set the system wake-up mode of the mobile terminal in the screen standby state to the pressure sensor wake-up mode in advance, so that after the mobile terminal enters the screen standby state, the pressure sensor can be continuously running, and the touch pressure corresponding to the touch operation is detected in real time by the pressure sensor. After detecting the touch pressure corresponding to the touch operation, the pressure sensor may determine whether the touch pressure corresponding to the touch operation is greater than a preset pressure. If the touch pressure is greater than the preset pressure, the pressure sensor turns on the touch sensor while waking up the mobile terminal, and whether the touch operation is within the fingerprint recognition area is determined by the touch sensor. When the touch operation is within the fingerprint recognition area, the fingerprint sensor or the pressure sensor sends a fingerprint acquisition instruction to the fingerprint recognition chip, so that after it is double determined by both the touch sensor and the pressure sensor that the user currently needs to unlock the mobile terminal with fingerprint, the fingerprint recognition chip may perform fingerprint acquisition according to the fingerprint acquisition instruction to unlock the mobile terminal. It can be seen that various embodiments of the present disclosure can combine the system wake-up process and the display screen unlocking process in the screen standby state of the mobile terminal, which can effectively prevent the user from unlocking the mobile terminal caused by an accidental touch when the mobile terminal is in the screen standby state, or can perform fingerprint acquisition while quickly waking up the system when the user wants to unlock the mobile terminal in the screen standby state, thereby saving power consumption when the mobile terminal is in the screen standby state, and prolonging the standby time of the mobile terminal.

Figure 5:
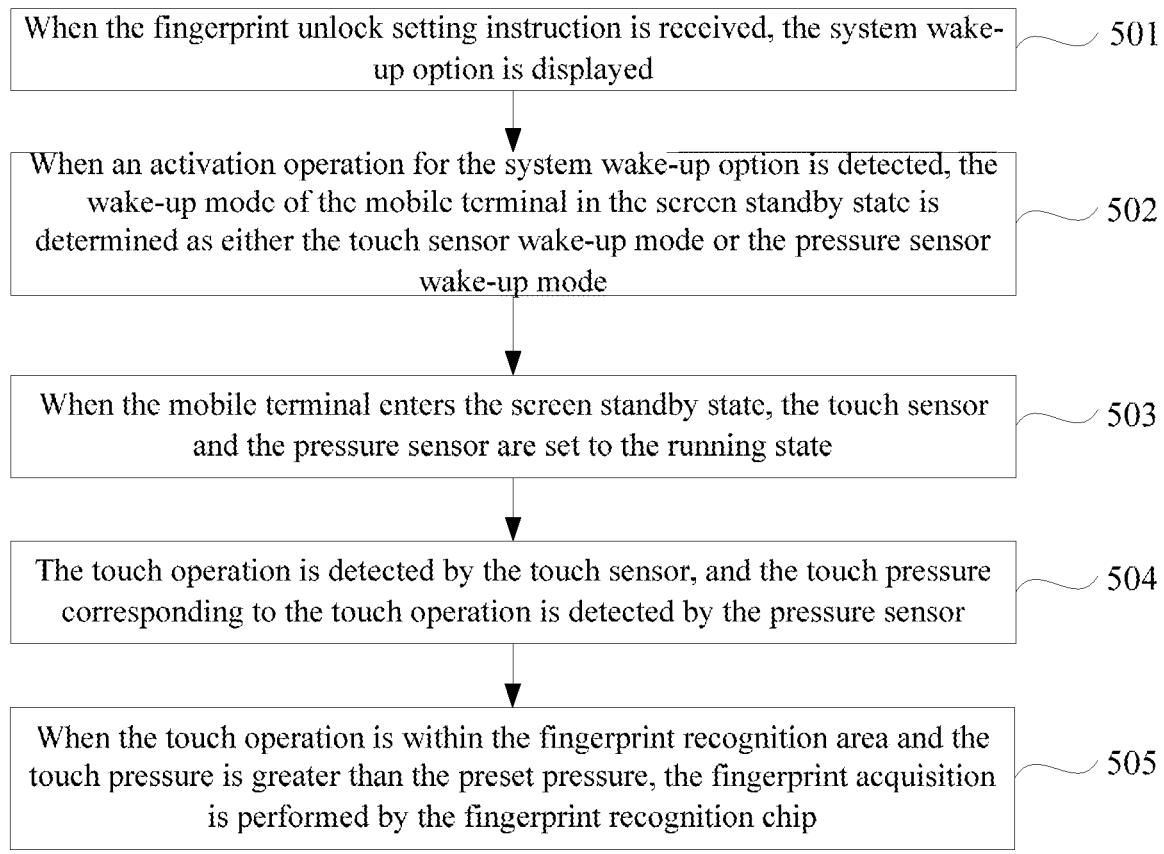
FIG. 5 is a flowchart of a fingerprint acquisition method according to some embodiments.

FIG. 5 is a flowchart of a fingerprint acquisition method according to some embodiments. The method may be applied to a mobile terminal such as a smart phone or a tablet computer. The third case described above is set forth in various embodiments of the present disclosure. As shown in FIG. 5, the method can include the following operations.

In step 501, when the fingerprint unlock setting instruction is received, the system wake-up option is displayed.

In various embodiments of the present disclosure, the user may set the system wake-up mode of the mobile terminal in the screen standby state in advance. Wherein, the user may select a fingerprint unlocking setting option in the mobile terminal to trigger a fingerprint unlocking setting instruction. When the mobile terminal receives the fingerprint unlocking setting instruction, the setting page may be displayed, and a system wake-up option may be displayed in the setting page. The user may activate it by selecting the system wake-up option. The mobile terminal may detect whether the user's activation operation for the system wake-up option is received, and when the activation operation is detected, step 502 is performed.

In step 502, when an activation operation for the system wake-up option is detected, the wake-up mode of the mobile terminal in the screen standby state is determined as either the touch sensor wake-up mode or the pressure sensor wake-up mode.

Wherein, for the touch sensor wake-up mode, reference may be made to the related explanation in step 302 in the foregoing embodiment, and for the pressure sensor wake-up mode, reference may be made to the related explanation in step 402 in the foregoing embodiment, and details are not described herein again.

In step 503, when the mobile terminal enters the screen standby state, the touch sensor and the pressure sensor are set to the running state.

After setting the system wake-up mode of the mobile terminal through steps 501 and 502, when the mobile terminal enters the screen standby state, both the touch sensor and the pressure sensor may be set to the running state. The running state may refer to both the touch sensor and the pressure sensor being continuously in running during the screen standby state of the mobile terminal. That is to say, during the process that the mobile terminal is in the screen standby state, both the touch sensor and the pressure sensor may continue to run, thereby detecting the user's touch operation and the touch pressure corresponding to the touch operation in real time.

In step 504, the touch operation is detected by the touch sensor, and the touch pressure corresponding to the touch operation is detected by the pressure sensor.

Generally, when the mobile terminal enters the screen standby state, the mobile terminal is in the screen lock state, and as described in the related description in step 503, at this time, both the touch sensor and the pressure sensor in the mobile terminal are continuously running. In this case, the mobile terminal can detect the touch operation in real time by the touch sensor, and detect the touch pressure corresponding to the touch operation by the pressure sensor.

Wherein, for the real time detection of the touch operation by the touch sensor, reference may be made to the related explanation in step 407 in the foregoing embodiment, for the detection of the touch pressure corresponding to the touch operation by the pressure sensor, reference may be made to the related explanation in step 307 in the foregoing embodiment, and details are not described herein again.

In step 505, when the touch operation is within the fingerprint recognition area and the touch pressure is greater than the preset pressure, the fingerprint acquisition is performed by the fingerprint recognition chip.

When the touch operation is within the fingerprint recognition area and the touch pressure is greater than the preset pressure, it indicates that the user currently needs to wake up the system to perform fingerprint unlocking. At this time, the touch sensor or the pressure sensor may send a wake-up instruction to the processor of the mobile terminal to wake up the mobile terminal. While waking up the mobile terminal, the touch sensor or the pressure sensor may send a fingerprint acquisition instruction to the fingerprint recognition chip disposed under the display screen. When the fingerprint recognition chip receives the fingerprint acquisition instruction, the fingerprint acquisition may be performed, thereby unlocking the mobile terminal according to the acquired fingerprint.

In various embodiments of the present disclosure, the user may set the system wake-up mode of the mobile terminal in the screen standby state to the touch sensor wake-up mode or the pressure sensor wake-up mode in advance, so that after the mobile terminal enters the screen standby state, the touch sensor and the pressure sensor can be continuously running, and the touch operation and the touch pressure corresponding to the touch operation are detected in real time by the touch sensor and the pressure sensor. After detecting the touch operation and the touch pressure corresponding to the touch operation, the touch sensor may determine whether the touch operation is within the fingerprint recognition area, and the pressure sensor may determine whether the touch pressure corresponding to the touch operation is greater than the preset pressure. If the touch operation is within the fingerprint recognition area and the touch pressure is greater than the preset pressure, the touch sensor or the pressure sensor sends a fingerprint acquisition instruction to the fingerprint recognition chip while waking up the mobile terminal, so that after it is double determined by both the touch sensor and the pressure sensor that the user currently needs to unlock the mobile terminal with fingerprint, the fingerprint recognition chip may perform fingerprint acquisition according to the fingerprint acquisition instruction to unlock the mobile terminal. It can be seen that various embodiments of the present disclosure combines the system wake-up process and the display screen unlocking process in the screen standby state of the mobile terminal, which can effectively prevent the user from unlocking the mobile terminal caused by an accidental touch when the mobile terminal is in the screen standby state, or can perform fingerprint acquisition while quickly waking up the system when the user wants to unlock the mobile terminal in the screen standby state.

Figure 6A:
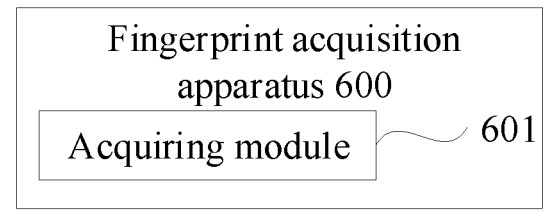
FIG. 6A is a block diagram of a fingerprint acquisition apparatus according to some embodiments.

FIG. 6A is a block diagram of a fingerprint acquisition apparatus 600 according to some embodiments. Referring to FIG. 6A, the apparatus 600 comprises an acquiring module 601.

The acquiring module 601 is configured to perform fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

Wherein the touch sensor is disposed in the display screen, the pressure sensor and the fingerprint recognition chip are disposed under the display screen, and the fingerprint recognition area refers to an area on the display screen corresponding to the fingerprint recognition chip.

Figure 6B:
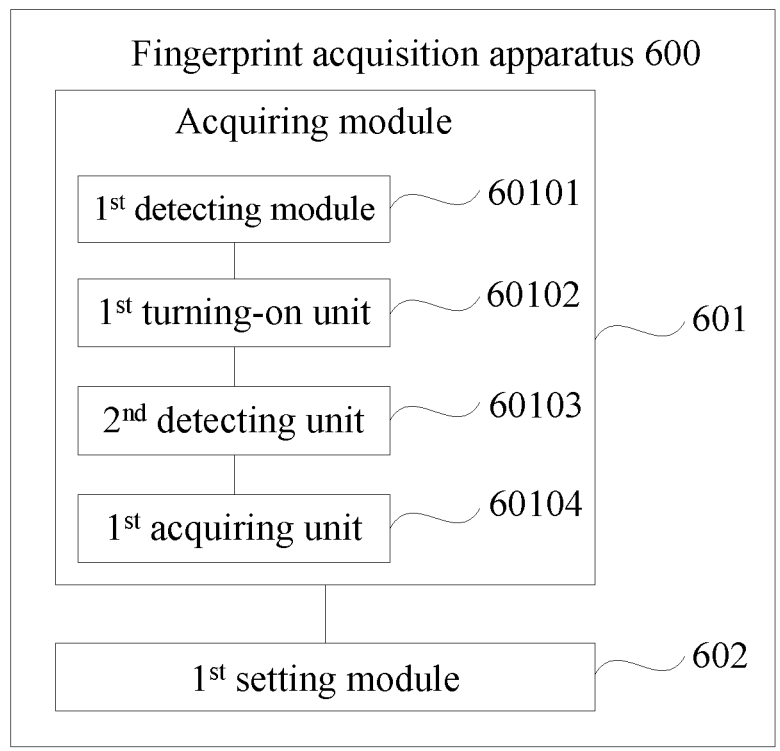
FIG. 6B is a block diagram of a fingerprint acquisition apparatus according to some embodiments.

In some embodiments, referring to FIG. 6B, the apparatus 600 further comprises:

A first setting module 602 configured to set the touch sensor to a running state when the mobile terminal enters a screen standby state;

Accordingly, the acquiring module 601 comprises:

A first detecting unit 60101 configured to detect the touch operation by the touch sensor;

A first turning-on unit 60102 configured to wake up the mobile terminal by the touch sensor and turn on the pressure sensor when it is determined by the touch sensor that the touch operation is within the fingerprint recognition area;

A second detecting unit 60103 configured to detect the touch pressure corresponding to the touch operation by the pressure sensor; and A first acquiring unit 60104 configured to perform fingerprint acquisition by the fingerprint recognition chip when the touch pressure is greater than the preset pressure.

Figure 6C:
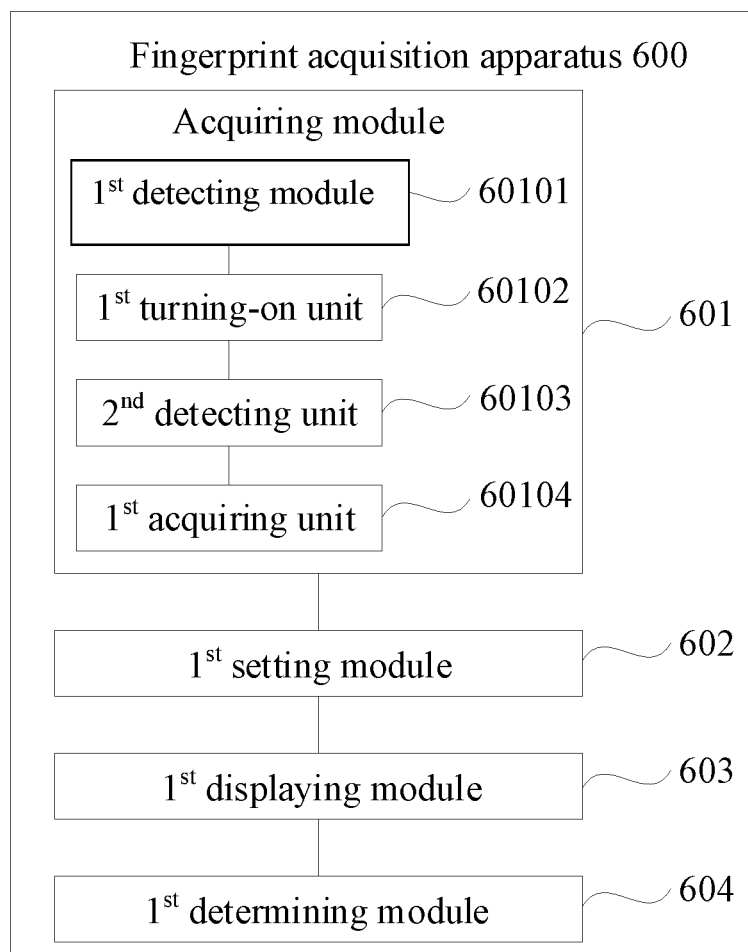
FIG. 6C is a block diagram of a fingerprint acquisition apparatus according to some embodiments.

In some embodiments, referring to FIG. 6C, the apparatus 600 further comprises:

A first displaying module 603 configured to display a system wake-up option when a fingerprint unlock setting instruction is received;

A first determining module 604 configured to determine a wake-up mode of the mobile terminal in the screen standby state as a touch sensor wake-up mode when an activation operation for the system wake-up option is detected.

Figure 6D:
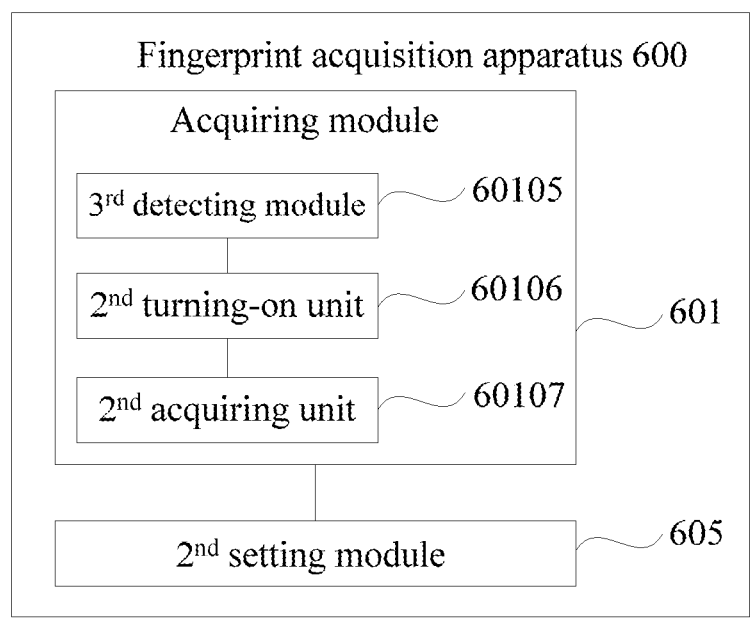
FIG. 6D is a block diagram of a fingerprint acquisition apparatus according to some embodiments.

In some embodiments, referring to FIG. 6D, the apparatus 600 further comprises:

A second setting module 605 configured to set the pressure sensor to a running state when the mobile terminal enters a screen standby state;

Accordingly, the acquiring module 601 comprises:

A third detecting unit 60105 configured to detect the touch pressure corresponding to the touch operation by the pressure sensor;

A second turning-on unit 60106 configured to wake up the mobile terminal by the pressure sensor and turning on the touch sensor when the touch pressure is greater than the preset pressure;

A second acquiring unit 60107 configured to perform fingerprint acquisition by the fingerprint recognition chip when it is determined by the touch sensor that the touch operation is within the fingerprint recognition area.

Figure 6E:
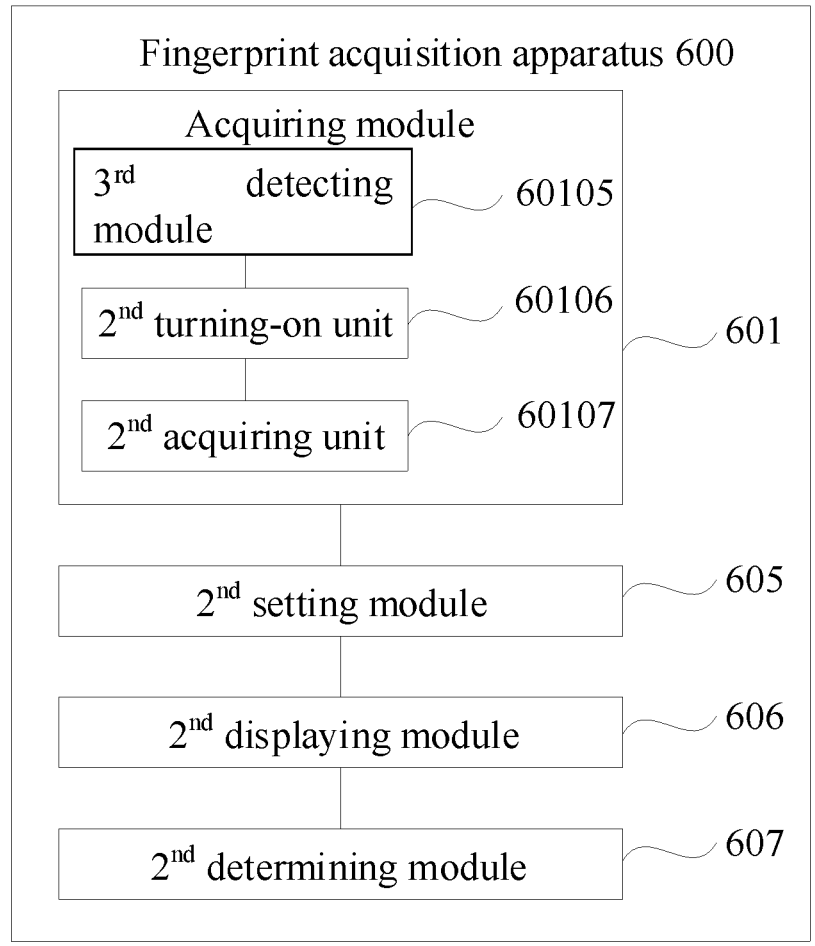
FIG. 6E is a block diagram of a fingerprint acquisition apparatus according to some embodiments.

In some embodiments, referring to FIG. 6E, the apparatus 600 further comprises:

A second displaying module 606 configured to display a system wake-up option when a fingerprint unlock setting instruction is received;

A second determining module 607 configured to determine a wake-up mode of the mobile terminal in the screen standby state as a pressure sensor wake-up mode when an activation operation for the system wake-up option is detected.

Figure 6F:
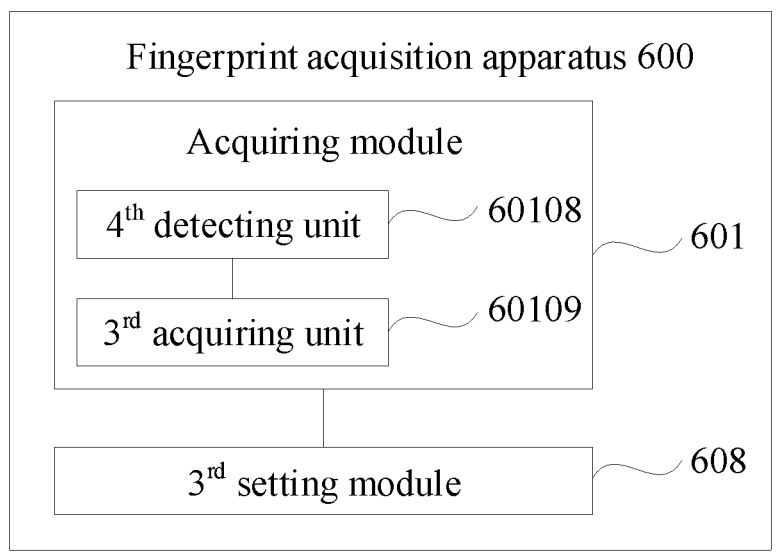
FIG. 6F is a block diagram of a fingerprint acquisition apparatus according to some embodiments.

In some embodiments, referring to FIG. 6F, the apparatus 600 further comprises:

A third setting module 608 configured to set the touch sensor and the pressure sensor to a running state when the mobile terminal enters a screen standby state;

Accordingly, the acquiring module comprises:

A fourth detecting unit 60108 configured to detect the touch operation by the touch sensor, and detect a touch pressure corresponding to the touch operation by the pressure sensor;

A third acquiring unit 60109 configured to perform fingerprint acquisition by the fingerprint recognition chip when it is determined by the touch sensor that the touch operation is within the fingerprint recognition area and the touch pressure is greater than the preset pressure.

Figure 6G:
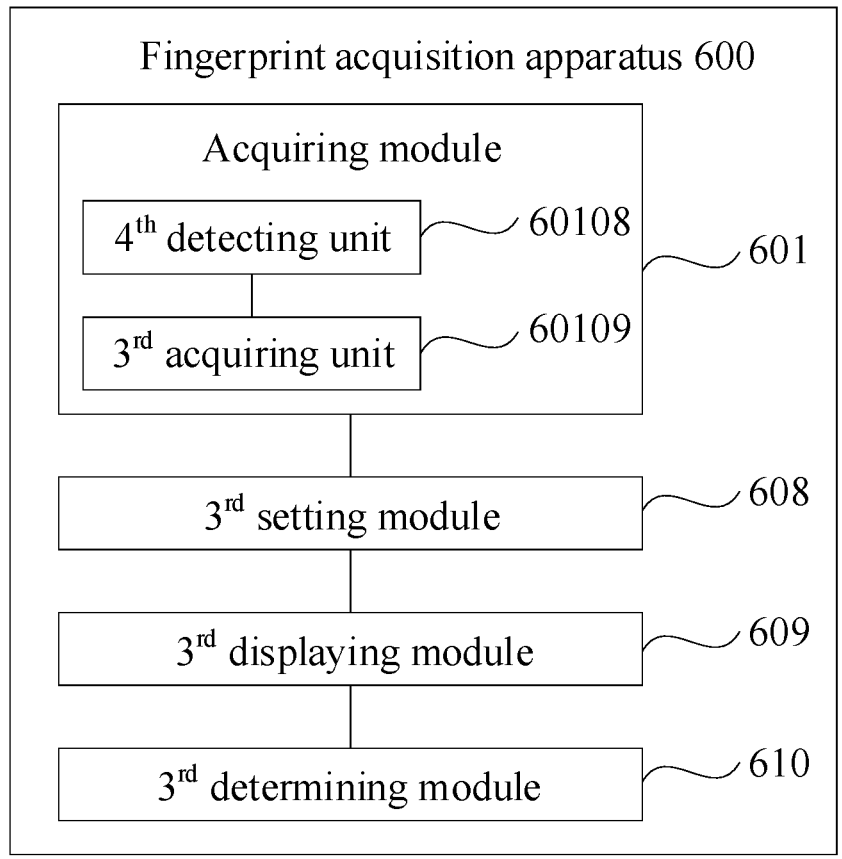
FIG. 6G is a block diagram of a fingerprint acquisition apparatus according to some embodiments.

In some embodiments, referring to FIG. 6G, the apparatus 600 further comprises:

A third displaying module 609 configured to display a system wake-up option when a fingerprint unlock setting instruction is received;

A third determining module 610 configured to determine a wake-up mode of the mobile terminal in the screen standby state as either a touch sensor wake-up mode or a pressure sensor wake-up mode when an activation operation for the system wake-up option is detected.

Figure 6H:
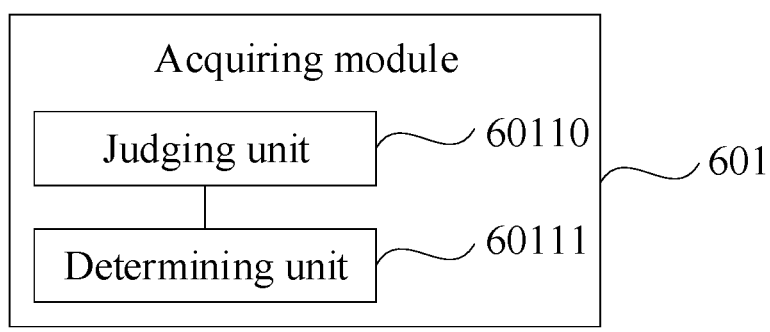
FIG. 6H is a block diagram of an acquiring module according to some embodiments.

In some embodiments, referring to FIG. 6H, the acquiring module 601 further comprises:

A judging unit 60110 configured to determine a coordinate of position point where the touch operation is applied by the touch sensor, and determine whether the coordinate of position point is located within the fingerprint recognition area;

A determining unit 60111 configured to determine that the touch operation is within the fingerprint recognition area if the coordinate of position point is located within the fingerprint recognition area.

In some embodiments, the acquiring module 601 is specifically configured to:

Send a fingerprint acquisition instruction to the fingerprint recognition chip by the touch sensor or the pressure sensor to trigger the fingerprint recognition chip to perform fingerprint acquisition.

Figure 6I:
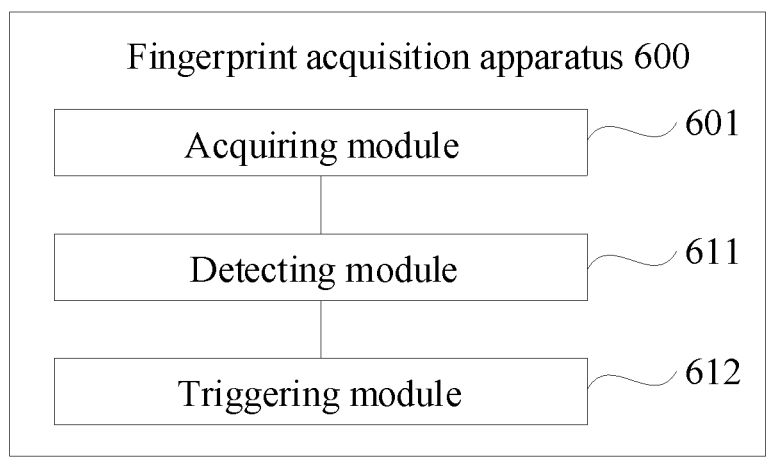
FIG. 6I is a block diagram of a fingerprint acquisition apparatus according to some embodiments.

In some embodiments, referring to FIG. 6I, the apparatus 600 further comprises:

A detecting module 611 configured to detect whether the mobile terminal is currently in a fingerprint registration state or a fingerprint recognition state;

A triggering module 612 configured to, if the mobile terminal is currently in the fingerprint registration state or the fingerprint recognition state, trigger the acquiring module 601 to perform fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

With regard to the apparatus in the above embodiments, the specific manner in which the respective components perform the operations has been described in detail in the embodiment relating to the method, and will not be explained in detail herein.

In various embodiments of the present disclosure, the mobile terminal may detect a touch operation by a touch sensor disposed in the display screen, and detect a touch pressure corresponding to the touch operation by a pressure sensor disposed under the display screen, if the touch operation is within the fingerprint recognition area and if the touch pressure is greater than the preset pressure, the fingerprint recognition chip can be used for fingerprint acquisition. It can be seen that, in various embodiments of the present disclosure, for the mobile terminal with the fingerprint recognition chip hidden under the display screen, the touch sensor disposed in the display screen can be directly used to detect the touch operation, and the pressure sensor disposed under the display screen can be used to detect the touch pressure corresponding to the touch operation, thereby determining whether the trigger operation needs to trigger the fingerprint recognition chip to perform image acquisition. In this way, during the use of the mobile terminal, it is possible to avoid additional power consumption of the fingerprint recognition chip during fingerprint acquisition due to an erroneous operation triggered by the user, and a standby time of the mobile terminal is prolonged.

Figure 7:
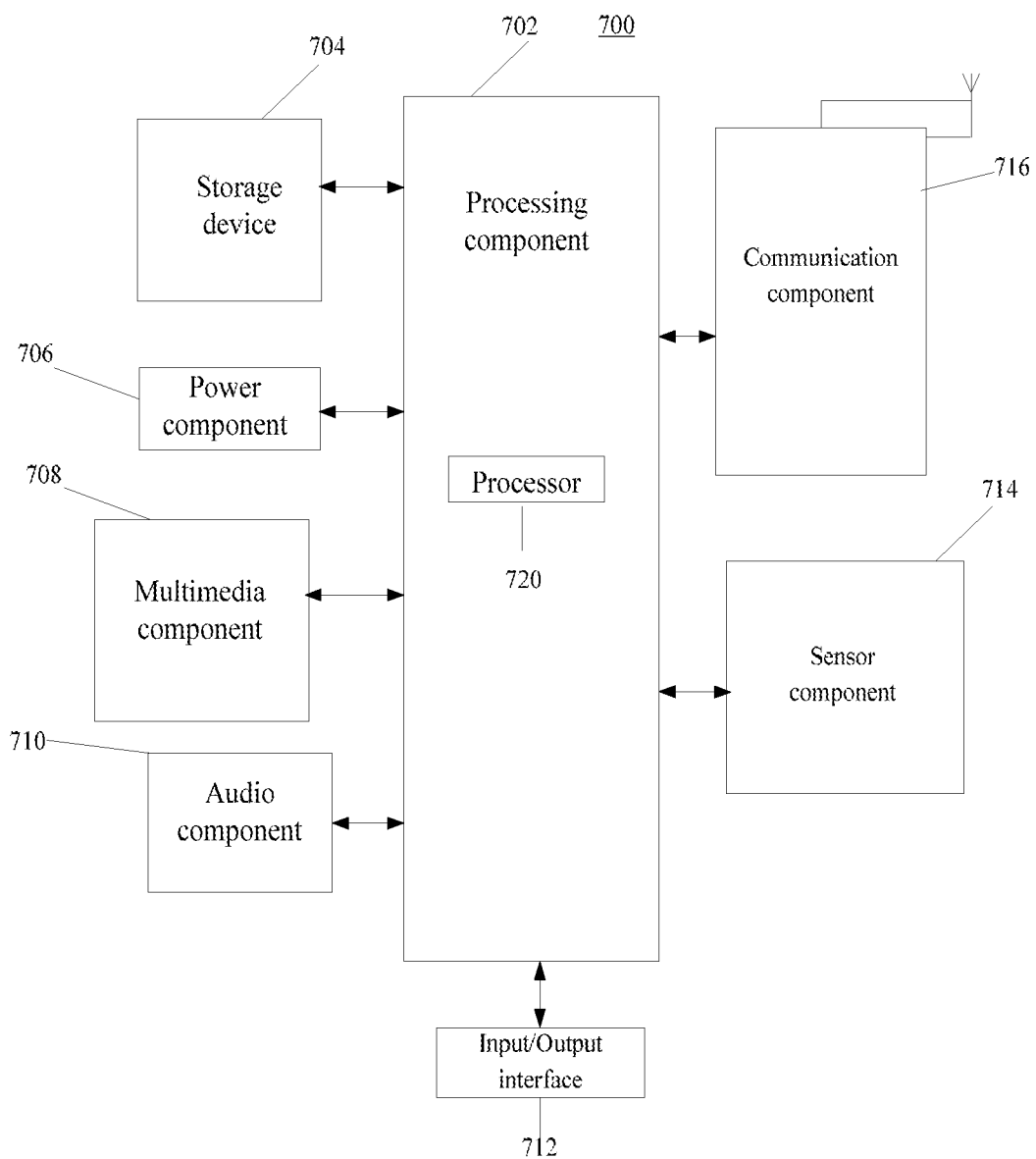
FIG. 7 is a block diagram of a fingerprint acquisition apparatus according to some embodiments.

FIG. 7 is a block diagram of an apparatus 700 for fingerprint acquisition according to some embodiments. For example, the apparatus 700 may be a mobile phone, a computer, a digital broadcast terminal, a messaging device, a gaming console, a tablet device, a medical device, a fitness device, a personal digital assistant, and the like.

Referring to FIG. 7, apparatus 700 may comprise one or more of the following components: processing component 702, storage device 704, power component 706, multimedia component 708, audio component 710, input/output (I/O) interface 712, sensor component 714, and communication component 716.

Processing component 702 typically controls the overall operation of apparatus 700, such as operations associated with display, telephone calls, data communications, camera operations, and recording operations. Processing component 702 may include one or more processors 720 to execute instructions to perform all or part of the steps described above. Moreover, processing component 702 may include one or more modules to facilitate interaction between component 702 and other components. For example, processing component 702 may include a multimedia module to facilitate interaction between multimedia component 708 and processing component 702.

It is noted that the various device components, units, blocks, or portions may have modular configurations, or are composed of discrete components, but nonetheless may be referred to as "modules" in general. In other words, the "modules" or "units" referred to herein may or may not be in modular forms.

Storage device 704 is configured to store various types of data to support operation at apparatus 700. Examples of such data include instructions for any application or method operating on apparatus 700, contact data, phone book data, messages, pictures, videos, and the like. Storage device 704 may be implemented by any type of volatile or non-volatile storage device, or a combination thereof, such as static random-access memory (SRAM), electrically erasable programmable read only memory (EEPROM), erasable programmable read only memory (EPROM), programmable read only memory (PROM), read only memory (ROM), magnetic memory, flash memory, disk or optical disk.

Power component 706 provides power to various components of apparatus 700. Power component 706 may include a power management system, one or more power sources, and other components associated with generating, managing, and distributing power to apparatus 700.

The multimedia component 708 includes a screen between the apparatus 700 and the user that provides an output interface. In some embodiments, the screen can include a liquid crystal display (LCD) and a touch panel (TP).

In some implementations, the display device is not limited to the LCD display, but can include, for example, LED (light-emitting diode), OLED (organic light-emitting diode), TFT (thin-film transistor), plasma, other flexible configuration, or any other monitor for displaying information to the user.

If the screen includes a touch panel, and the screen can be implemented as a touch screen to receive input signals from the user. The touch panel includes one or more touch sensors to sense touches, swipes, and gestures on the touch panel. The touch sensor may sense not only the boundary of the touch or swiping action, but also the duration and pressure associated with the touch or swiping operation.

In some embodiments, the multimedia component 708 includes a front camera and/or a rear camera. When apparatus 700 is in an operation mode, such as a shooting mode or a video mode, the front camera and/or the rear camera can receive external multimedia data. Each front and rear camera can be a fixed optical lens system or have focal length and optical zoom capabilities.

Audio component 710 is configured to output and/or input an audio signal. For example, audio component 710 includes a microphone (MIC) that is configured to receive an external audio signal when apparatus 700 is in an operational mode, such as a call mode, a recording mode, and a voice recognition mode. The received audio signal may be further stored in storage device 704 or transmitted via communication component 716. In some embodiments, audio component 710 also includes a speaker for outputting an audio signal.

I/O interface 712 provides an interface between processing component 702 and a peripheral interface module, which may be a keyboard, a click wheel, a button, or the like. These buttons may include, but are not limited to, a home button, a volume button, a start button, and a lock button.

Sensor component 714 includes one or more sensors for providing state assessment of various aspects to apparatus 700. For example, sensor component 714 may detect an on/off state of apparatus 700, relative positioning of components, such as the display and keypad of apparatus 700, and sensor component 714 may also detect a change in position of apparatus 700 or one component of apparatus 700, the presence or absence of user contact with apparatus 700, orientation or acceleration/deceleration of apparatus 700, and temperature variation of apparatus 700. Sensor component 714 may include a proximity sensor configured to detect the presence of nearby objects without any physical contact. Sensor component 714 may also include a light sensor, such as a CMOS or CCD image sensor, for use in imaging applications. In some embodiments, the sensor component 714 may also include an acceleration sensor, a gyro sensor, a magnetic sensor, a pressure sensor, or a temperature sensor.

Communication component 716 is configured to facilitate wired or wireless communication between apparatus 700 and other devices. The apparatus 700 may access a wireless network based on a communication standard, such as WiFi, 2G or 3G or a combination thereof. In some embodiments, communication component 716 receives broadcast signals or broadcast associated information from an external broadcast management system via a broadcast channel. In some embodiments, communication component 716 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology, and other technologies.

In some embodiments, apparatus 700 may be implemented by one or more of application specific integrated circuit (ASIC), digital signal processor (DSP), digital signal processing device (DSPD), programmable logic device (PLD), field programmable gate array (FPGA), controller, microcontroller, microprocessor or other electronic component for performing the fingerprint acquisition method provided by the embodiment shown in FIG. 1, FIG. 2, FIG. 3, FIG. 4 or FIG. 5.

In some embodiments, there is also provided a non-transitory computer readable storage device comprising instructions, such as a storage device 704 comprising instructions executable by processor 720 of apparatus 700 to perform the above method. For example, the non-transitory computer readable storage medium may be a ROM, a random-access memory (RAM), a CD-ROM, a magnetic tape, a floppy disk, and an optical data storage device. That is, various embodiments of the present disclosure can further provide a non-transitory computer readable storage medium, when the instructions in the storage medium are executed by the processor of the mobile terminal, the mobile terminal is enabled to perform the fingerprint acquisition method provided by the above embodiments.

Various embodiments of the present disclosure also provide a computer program product that, when run on a computer, causes the computer to perform the fingerprint acquisition method provided by the above embodiments.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A fingerprint acquisition method, comprising:
performing fingerprint acquisition by a fingerprint recognition chip upon a touch operation acting on a display screen of a mobile terminal being detected by a touch sensor to be in a fingerprint recognition area, and a touch pressure corresponding to the touch operation being detected by a pressure sensor to be greater than a preset pressure;
wherein the touch sensor is disposed in the display screen, the pressure sensor and the fingerprint recognition chip are disposed under the display screen, and the fingerprint recognition area correspond to the fingerprint recognition chip on the display screen;
the method further comprising:
when the mobile terminal enters a screen standby state, setting the touch sensor to a running state;
wherein the performing fingerprint acquisition comprises:
detecting the touch operation by the touch sensor;
when it is determined by the touch sensor that the touch operation is within the fingerprint recognition area, waking up the mobile terminal by the touch sensor and turning on the pressure sensor;
detecting the touch pressure corresponding to the touch operation by the pressure sensor; and
upon the touch pressure being greater than the preset pressure, performing the fingerprint acquisition by the fingerprint recognition chip.

2. The method according to claim 1, wherein prior to the setting the touch sensor to a running state, the method further comprises:
when a fingerprint unlock setting instruction is received, displaying a system wake-up option; and
when an activation operation for the system wake-up option is detected, determining a wake-up mode of the mobile terminal in the screen standby state as a touch sensor wake-up mode.

3. The method according to claim 1, wherein the determining by the touch sensor that the touch operation is within the fingerprint recognition area comprises:
determining a coordinate of position point where the touch operation is applied by the touch sensor, and judging whether the coordinate of position point is located within the fingerprint recognition area; and
if the coordinate of position point is located within the fingerprint recognition area, determining that the touch operation is within the fingerprint recognition area.

4. The method according to claim 1, wherein the performing the fingerprint acquisition by the fingerprint recognition chip comprises:

sending a fingerprint acquisition instruction to the fingerprint recognition chip by the touch sensor or the pressure sensor to trigger the fingerprint recognition chip to perform fingerprint acquisition.

5. The method according to claim 1, further comprising:
detecting whether the mobile terminal is currently in a fingerprint registration state or a fingerprint recognition state; and
if the mobile terminal is currently in the fingerprint registration state or the fingerprint recognition state, executing the step of performing fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

6. A fingerprint acquisition method, comprising:
performing fingerprint acquisition by a fingerprint recognition chip upon a touch operation acting on a display screen of a mobile terminal being detected by a touch sensor to be in a fingerprint recognition area, and a touch pressure corresponding to the touch operation being detected by a pressure sensor to be greater than a preset pressure;
wherein the touch sensor is disposed in the display screen, the pressure sensor and the fingerprint recognition chip are disposed under the display screen, and the fingerprint recognition area correspond to the fingerprint recognition chip on the display screen;
the method further comprising:
when the mobile terminal enters a screen standby state, setting the pressure sensor to a running state;
wherein the performing fingerprint acquisition comprises:
detecting the touch pressure corresponding to the touch operation by the pressure sensor;
when the touch pressure is greater than the preset pressure, waking up the mobile terminal by the pressure sensor and turning on the touch sensor; and
when it is determined by the touch sensor that the touch operation is within the fingerprint recognition area, performing fingerprint acquisition by the fingerprint recognition chip.

7. The method according to claim 6, wherein prior to the setting the pressure sensor to a running state, the method further comprises:
when a fingerprint unlock setting instruction is received, displaying a system wake-up option; and
when an activation operation for the system wake-up option is detected, determining a wake-up mode of the mobile terminal in the screen standby state as a pressure sensor wake-up mode.

8. The method according to claim 6, wherein
the determining by the touch sensor that the touch operation is within the fingerprint recognition area comprises:
determining a coordinate of position point where the touch operation is applied by the touch sensor, and judging whether the coordinate of position point is located within the fingerprint recognition area; and
in a case that the coordinate of position point is located within the fingerprint recognition area, determining that the touch operation is within the fingerprint recognition area.

9. A fingerprint acquisition method, comprising:
performing fingerprint acquisition by a fingerprint recognition chip upon a touch operation acting on a display screen of a mobile terminal being detected by a touch sensor to be in a fingerprint recognition area, and a touch pressure corresponding to the touch operation being detected by a pressure sensor to be greater than a preset pressure;
wherein the touch sensor is disposed in the display screen, the pressure sensor and the fingerprint recognition chip are disposed under the display screen, and the fingerprint recognition area correspond to the fingerprint recognition chip on the display screen;
the method further comprising:
when the mobile terminal enters a screen standby state, setting the touch sensor and the pressure sensor to a running state;
wherein the performing fingerprint acquisition comprises:
detecting the touch operation by the touch sensor, and detecting the touch pressure corresponding to the touch operation by the pressure sensor; and
when it is determined by the touch sensor that the touch operation is within the fingerprint recognition area and the touch pressure is greater than the preset pressure, performing the fingerprint acquisition by the fingerprint recognition chip.

10. The method according to claim 9, wherein prior to the setting the touch sensor and the pressure sensor to a running state, the method further comprises:
when a fingerprint unlock setting instruction is received, displaying a system wake-up option; and
when an activation operation for the system wake-up option is detected, determining a wake-up mode of the mobile terminal in the screen standby state as either a touch sensor wake-up mode or a pressure sensor wake-up mode.

11. The method according to claim 9, wherein
the determining by the touch sensor that the touch operation is within the fingerprint recognition area comprises:
determining a coordinate of position point where the touch operation is applied by the touch sensor, and judging whether the coordinate of position point is located within the fingerprint recognition area; and
in a case that the coordinate of position point is located within the fingerprint recognition area, determining that the touch operation is within the fingerprint recognition area.

12. A fingerprint acquisition apparatus, comprising:
a processor; and
a storage device configured to store an executable instruction of the processor;
wherein the processor is configured to perform fingerprint acquisition by a fingerprint recognition chip upon a touch operation acting on a display screen of a mobile terminal being detected by a touch sensor to be in a fingerprint recognition area, and a touch pressure corresponding to the touch operation is detected by a pressure sensor to be greater than a preset pressure; and
wherein the touch sensor is disposed in the display screen, the pressure sensor and the fingerprint recognition chip are disposed under the display screen, and the fingerprint recognition area corresponds to the fingerprint recognition chip on the display screen;
wherein the processor is further configured to:
set the touch sensor to a running state when the mobile terminal enters a screen standby state;
detect the touch operation by the touch sensor;
wake up the mobile terminal by the touch sensor and turn on the pressure sensor when it is determined by the touch sensor that the touch operation is within the fingerprint recognition area;

detect the touch pressure corresponding to the touch operation by the pressure sensor; and perform fingerprint acquisition by the fingerprint recognition chip when the touch pressure is greater than the preset pressure.

13. The apparatus according to claim 12, wherein the processor is further configured to:

display a system wake-up option when a fingerprint unlock setting instruction is received; and determine a wake-up mode of the mobile terminal in the screen standby state as a touch sensor wake-up mode when an activation operation for the system wake-up option is detected.

14. The apparatus according to claim 12, wherein the processor is further configured to:

determine a coordinate of position point where the touch operation is applied by the touch sensor, and determine whether the coordinate of position point is located within the fingerprint recognition area; and determine that the touch operation is within the fingerprint recognition area if the coordinate of position point is located within the fingerprint recognition area.

15. The apparatus according to claim 12, wherein the processor is further configured to:

send a fingerprint acquisition instruction to the fingerprint recognition chip by the touch sensor or the pressure sensor to trigger the fingerprint recognition chip to perform fingerprint acquisition.

16. The apparatus according to claim 12, wherein the processor is further configured to:

detect whether the mobile terminal is currently in a fingerprint registration state or a fingerprint recognition state; and if the mobile terminal is currently in the fingerprint registration state or the fingerprint recognition state, perform fingerprint acquisition by a fingerprint recognition chip when a touch operation acting on a display screen of a mobile terminal is detected by a touch sensor to be in a fingerprint recognition area, and a touch pressure corresponding to the touch operation is detected by a pressure sensor to be greater than a preset pressure.

17. A fingerprint acquisition apparatus, comprising:

a processor; and a storage device configured to store an executable instruction of the processor;

wherein the processor is configured to perform fingerprint acquisition by a fingerprint recognition chip upon a touch operation acting on a display screen of a mobile terminal being detected by a touch sensor to be in a fingerprint recognition area, and a touch pressure corresponding to the touch operation is detected by a pressure sensor to be greater than a preset pressure;

wherein the touch sensor is disposed in the display screen, the pressure sensor and the fingerprint recognition chip are disposed under the display screen, and the fingerprint recognition area corresponds to the fingerprint recognition chip on the display screen; and wherein the processor is further configured to:

set the pressure sensor to a running state when the mobile terminal enters a screen standby state;

detect the touch pressure corresponding to the touch operation by the pressure sensor;

wake up the mobile terminal by the pressure sensor and turning on the touch sensor when the touch pressure is greater than the preset pressure; and perform fingerprint acquisition by the fingerprint recognition chip when it is determined by the touch sensor that the touch operation is within the fingerprint recognition area.

18. The apparatus according to claim 17, wherein the processor is further configured to:

display a system wake-up option when a fingerprint unlock setting instruction is received; and determine a wake-up mode of the mobile terminal in the screen standby state as a pressure sensor wake-up mode when an activation operation for the system wake-up option is detected.

19. The apparatus according to claim 17, wherein the processor is further configured to:

determine a coordinate of position point where the touch operation is applied by the touch sensor, and determine whether the coordinate of position point is located within the fingerprint recognition area; and determine that the touch operation is within the fingerprint recognition area upon that the coordinate of position point is located within the fingerprint recognition area.

20. A fingerprint acquisition apparatus, comprising:

a processor; and a storage device configured to store an executable instruction of the processor;

wherein the processor is configured to perform fingerprint acquisition by a fingerprint recognition chip upon a touch operation acting on a display screen of a mobile terminal being detected by a touch sensor to be in a fingerprint recognition area, and a touch pressure corresponding to the touch operation is detected by a pressure sensor to be greater than a preset pressure; and wherein the touch sensor is disposed in the display screen, the pressure sensor and the fingerprint recognition chip are disposed under the display screen, and the fingerprint recognition area corresponds to the fingerprint recognition chip on the display screen; and wherein the processor is further configured to:

set the touch sensor and the pressure sensor to a running state when the mobile terminal enters a screen standby state;

detect the touch operation by the touch sensor, and detect the touch pressure corresponding to the touch operation by the pressure sensor;

perform fingerprint acquisition by the fingerprint recognition chip when it is determined by the touch sensor that the touch operation is within the fingerprint recognition area and the touch pressure is greater than the preset pressure;

display a system wake-up option when a fingerprint unlock setting instruction is received; and determine a wake-up mode of the mobile terminal in the screen standby state as either a touch sensor wake-up mode or a pressure sensor wake-up mode when an activation operation for the system wake-up option is detected.

21. The apparatus according to claim 20, wherein the processor is further configured to:

determine a coordinate of position point where the touch operation is applied by the touch sensor, and determine whether the coordinate of position point is located within the fingerprint recognition area; and determine that the touch operation is within the fingerprint recognition area upon that the coordinate of position point is located within the fingerprint recognition area.

\* \* \* \* \*